United States Patent
DeAnna

(10) Patent No.: US 6,249,421 B1
(45) Date of Patent: Jun. 19, 2001

(54) ELECTROSTATIC ACTUATION CONTROL SYSTEM

(75) Inventor: Russell G. DeAnna, Westlake, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/405,306

(22) Filed: Sep. 13, 1999

(51) Int. Cl.[7] .................... H01H 57/00; H01G 23/00
(52) U.S. Cl. .................... 361/233; 200/181; 438/666
(58) Field of Search .................... 361/230, 233, 361/234, 212, 215; 279/128; 269/8; 200/181; 438/666

(56) References Cited

U.S. PATENT DOCUMENTS

| | | | |
|---|---|---|---|
| 4,160,141 | * 7/1979 | Graf | 359/228 |
| 4,264,798 | * 4/1981 | Graf | 200/181 |
| 5,824,204 | * 10/1998 | Jerman | 204/601 |
| 5,880,921 | * 3/1999 | Tham et al. | 361/233 |
| 5,998,292 | * 12/1999 | Black et al. | 438/618 |

\* cited by examiner

*Primary Examiner*—Michael J. Sherry
*Assistant Examiner*—Kim Huynh
(74) *Attorney, Agent, or Firm*—Paul S. Clohan, Jr.

(57) ABSTRACT

Electrostatic actuation arrangements are disclosed comprising of at least two wafers and having electrodes formed on their facing surfaces. One of the wafers has holes in it while the other wafer has posts extending therefrom. The holes and the posts are arranged so as to face each other and a voltage is applied to the electrodes across the wafers so that they can be moved toward and away from each other allowing such a movement to control fluid or optical parameters.

27 Claims, 6 Drawing Sheets

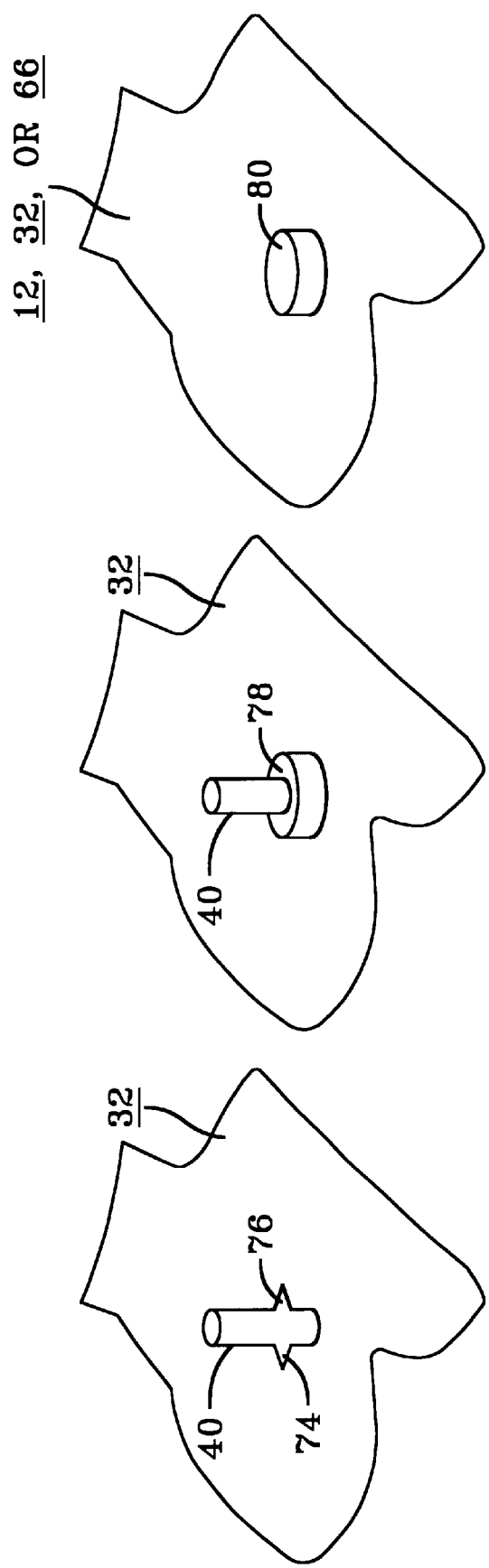

ELECTROSTATIC ACTUATION CONTROL SYSTEM

ORIGIN OF THE INVENTION

The invention described herein was made in the performance of official duties by an employee of the Department of the Army and may be manufactured, used, licensed by or for the Government for any governmental purpose without the payment of any royalty thereon.

BACKGROUND OF THE INVENTION

1.0 Field of the Invention

The present invention relates to a control system and, more particularly, to an electrostatic actuating control system that utilizes miniature silicon wafers and finds applications in fluid control systems and optical applications.

2.0 Description of the Prior Art

Microfabrication techniques employed in standard integrating circuit processing industry have lead to the fabrication of miniature devices, such as wafers formed of silicon.

Miniature devices because of their small dimensions and relatively light weight may be advantageously used in control systems, such as an electrostatic control system, that utilizes the movement of members to accomplish a control function. It is desired that an electrostatic actuating arrangement be provided that utilizes relatively small wafers to accomplish control functions and that find application in a fluid control system or in an optical application.

SUMMARY OF THE INVENTION

Accordingly, it is a primary object of the present invention to provide for an electrostatic actuating system that employs miniature wafers that are physically moved to accomplish a desired control operation.

It is another object of the present invention to provide means for ensuring that movable wafers are returned to their home position whenever moved therefrom.

It is yet another object of the present invention to provide for an electrostatic actuating control system that is responsive to high-frequency actuations.

In accordance with these and other objects, the present invention provides an electrostatic actuating system comprising at least first and second wafers and a first source of voltage. The first wafer as at least one hole in it and the second wafer has at least one post extending upward from one of its surfaces and which is dimensioned so as to be insertable into the at least one hole. The first and second wafers have faces that are arranged so that the post faces the hole. The first and second wafers have a layer of conductive material placed on one of their facing surfaces which serve as an electrode. The hole and the post are free of the conductive material. The source of voltage is applied across the electrodes of the first and second wafers.

BRIEF DESCRIPTION OF THE DRAWINGS

The foregoing objects and advantages of the present invention will be more fully understood from the following detailed description having reference to the appended drawings wherein:

FIG. 5, 6 and 7 illustrates various embodiments that ensure that the wafers of the present invention are returned to their home position when moved therefrom;

DETAILED DESCRIPTION OF THE PREFERRED EMBODIMENTS

The invention provides an electrostatic actuation arrangement 10 that finds application in many fields, such as those involved with fluid control or optical interactions.

Figure 1:
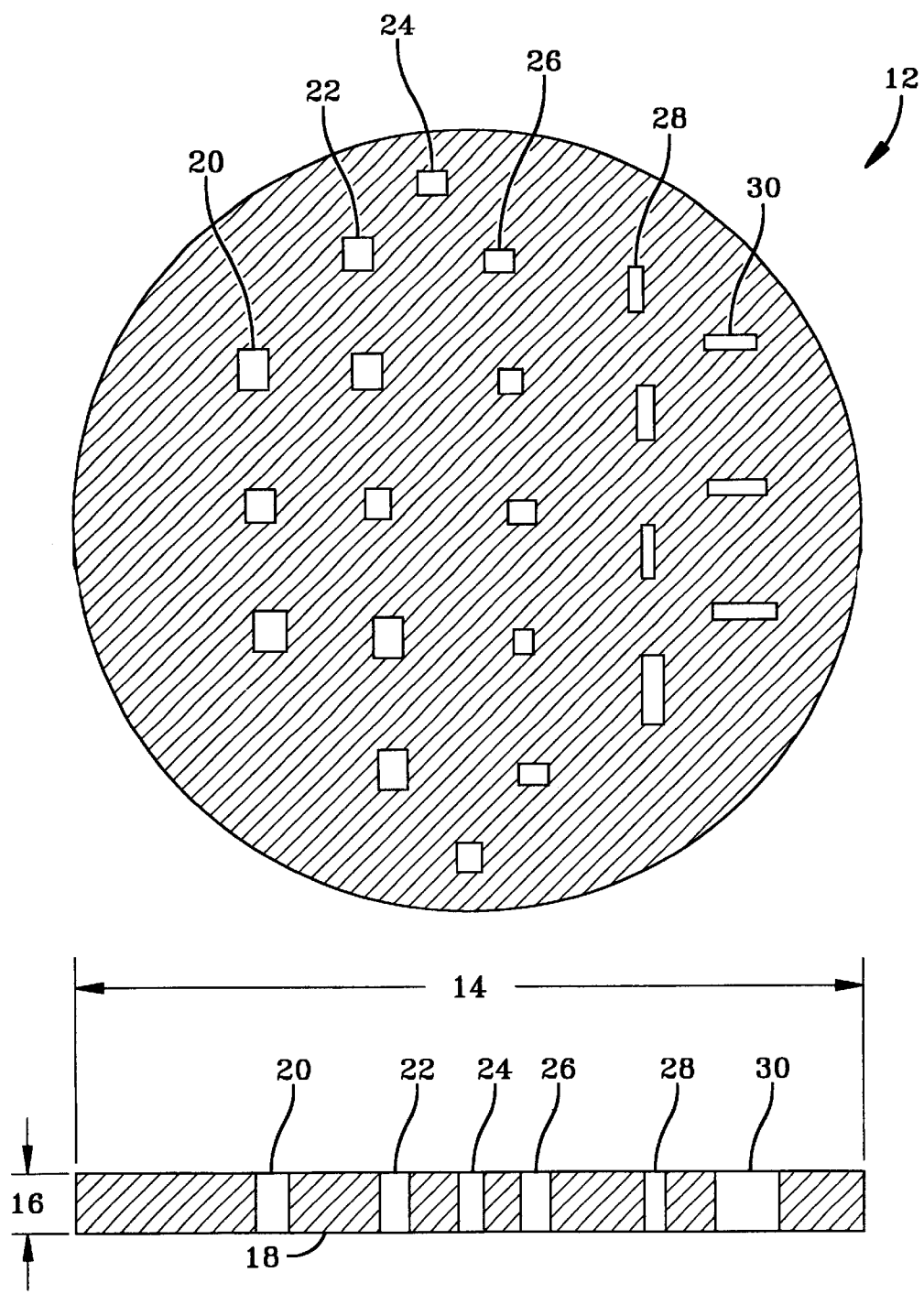
FIG. 1 illustrates one of the wafers used in the practice of the present invention.

Referring to the drawings, wherein the same reference number indicates the same element throughout, there is shown in FIG. 1 a wafer 12 used in the electrostatic actuation arrangement 10 to be further discussed with reference to FIG. 3 and having a typical diameter 14 of up to 200 millimeters (mm), and a typical thickness 16 from about 100 micrometers to about 200 micrometers. The wafer 12 has an electrode 18. The wafer 12 can be of any shape and does not have to be a circle. The wafer 12 can be of any diameter and can be as small as a few millimeters or as large as a full 4", 6", or 8" standard silicon wafer.

The wafer 12 is preferably comprised of silicon and has a series of holes 20, 22, 24, 26, 28 and 30, arranged in columns as shown in FIG. 1, with the holes 20 . . . 30 being provided by deep reactive ion etching (DRIE), known in the art of silicon fabrication. It should be noted that the holes 20, 22, 24, 26, 28 and 30 are shown in FIG. 1 as being both on the surface of the wafer 12 and also in cross section (lower portion of FIG. 1). The holes 20 . . . 30 can have any cross-sectional shape to suit any given application, and wherein circles and squares cross-sectional shapes are commonly used in fluid boundary-layer applications, and triangles and rectangles cross-sectional shapes are commonly used in optical applications. The electrostatic actuating system 10 further utilizes a second wafer 32 that may be described with reference to FIG. 2.

Figure 2:
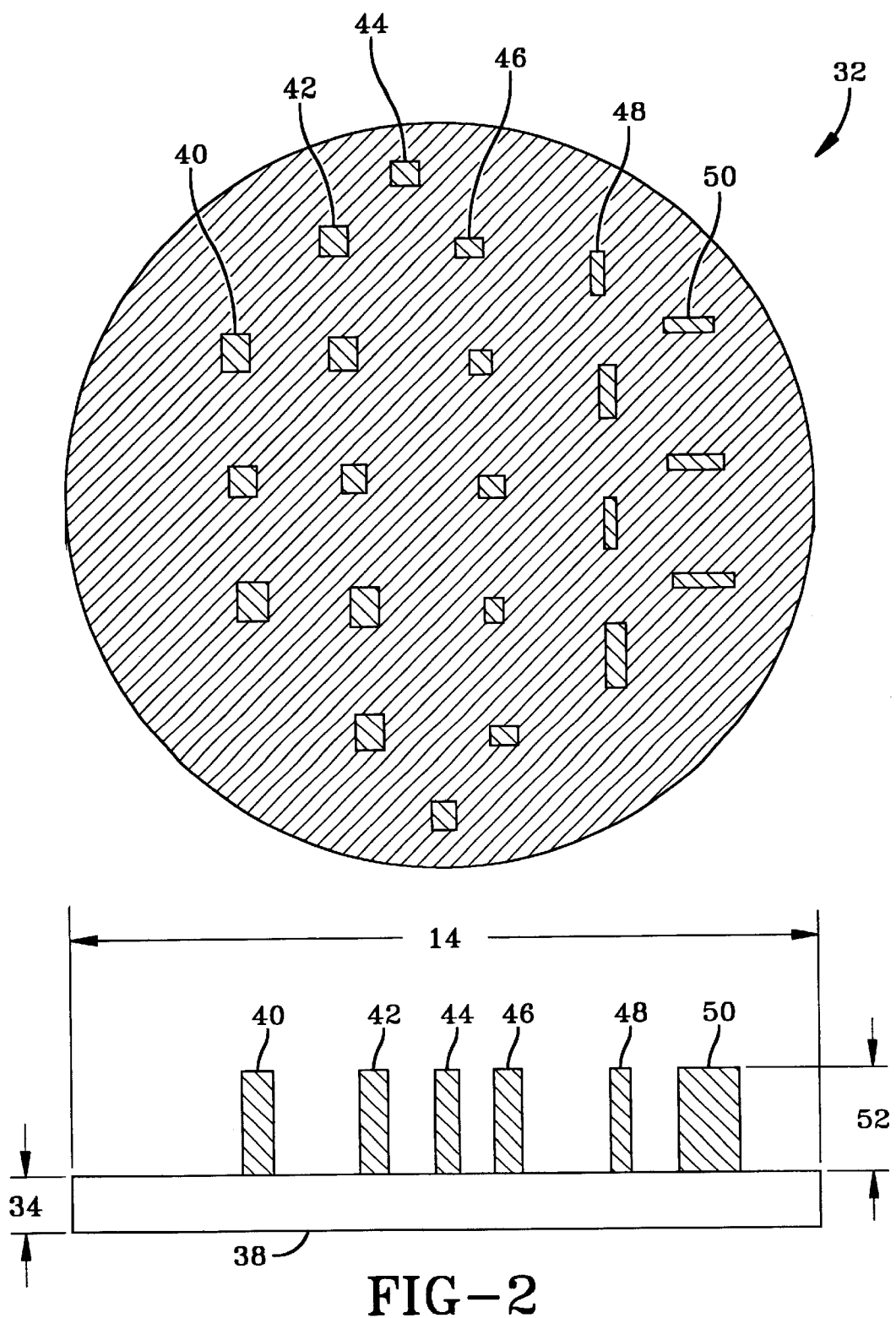
FIG. 2 illustrates the second wafer used in the practice of the present invention.

FIG. 2 illustrates the second wafer 32 as having the same diameter 14 as that of the first wafer 12, a thickness 34 that has a range of about 100 micrometers to 300 micrometers, and an electrode 38 that is used in different applications for the present invention. The electrode 38, as well as the electrode 18 of the first wafer 12 and the electrode of the third wafer to be described hereinafter, comprises a metal or a layer of conductive material sputtered or applied over one of the entire surfaces thereof. The electrodes are formed so that the holes 20, 22, 24, 26, 28 and 30 of FIG. 1, as well as the post 40, 42, 44, 46, 48 and 50 of FIG. 2, are free of conductive material.

The posts 40, 42, 44, 46, 48 and 50 are shown in FIG. 2 as both being located in the surface of the second wafer 32 and in the lower portion of FIG. 2 as extending upward from the upper surface of wafer 32 as viewed in FIG. 2 by distance 52 having a typical value of 0.4 mm. The posts 40, 42, 44, 46, 48 and 50 have complementary dimensions relative to holes 20, 22, 24, 26, 28 and 30 respectively. More particularly, when the first and second wafers 12 and 32 are arranged so as to be facing each other, the posts 40, 42, 44, 46, 48 and 50 are respectively insertable into the holes 20, 22, 24, 26, 28 and 30. A comparison between FIGS. 1 and 2 also reveals that cross-section of the holes 20 . . . 30 respectively match 40 . . . 50 and, accordingly, the selection of the cross-sectional shapes of holes 20 . . . 30 for particular applications, previously discussed, are the same for the posts 40 . . . 50.

Each of the wafers 12 and 32 preferably has a minimum thickness of 100 micrometers so as to prevent their damage during handling. A typical wafer arrangement, comprising wafers 12 and 32, has a thickness of 500 micrometers, wherein the first wafer 12 has a thickness of about 100 to about 200 micrometers and the second wafer 32 has a thickness of about 100 to 300 micrometers so that the overall thickness is 500 micrometers. For a three wafer arrangement, to be described with reference to FIG. 4, this overall thickness may be about 1000 micrometers. An electrostatic actuation arrangement, sometimes referred to as a parallel-plate plate configuration, utilizing the wafers 12 and 32 may be further described with reference to FIG. 3.

Figure 3:
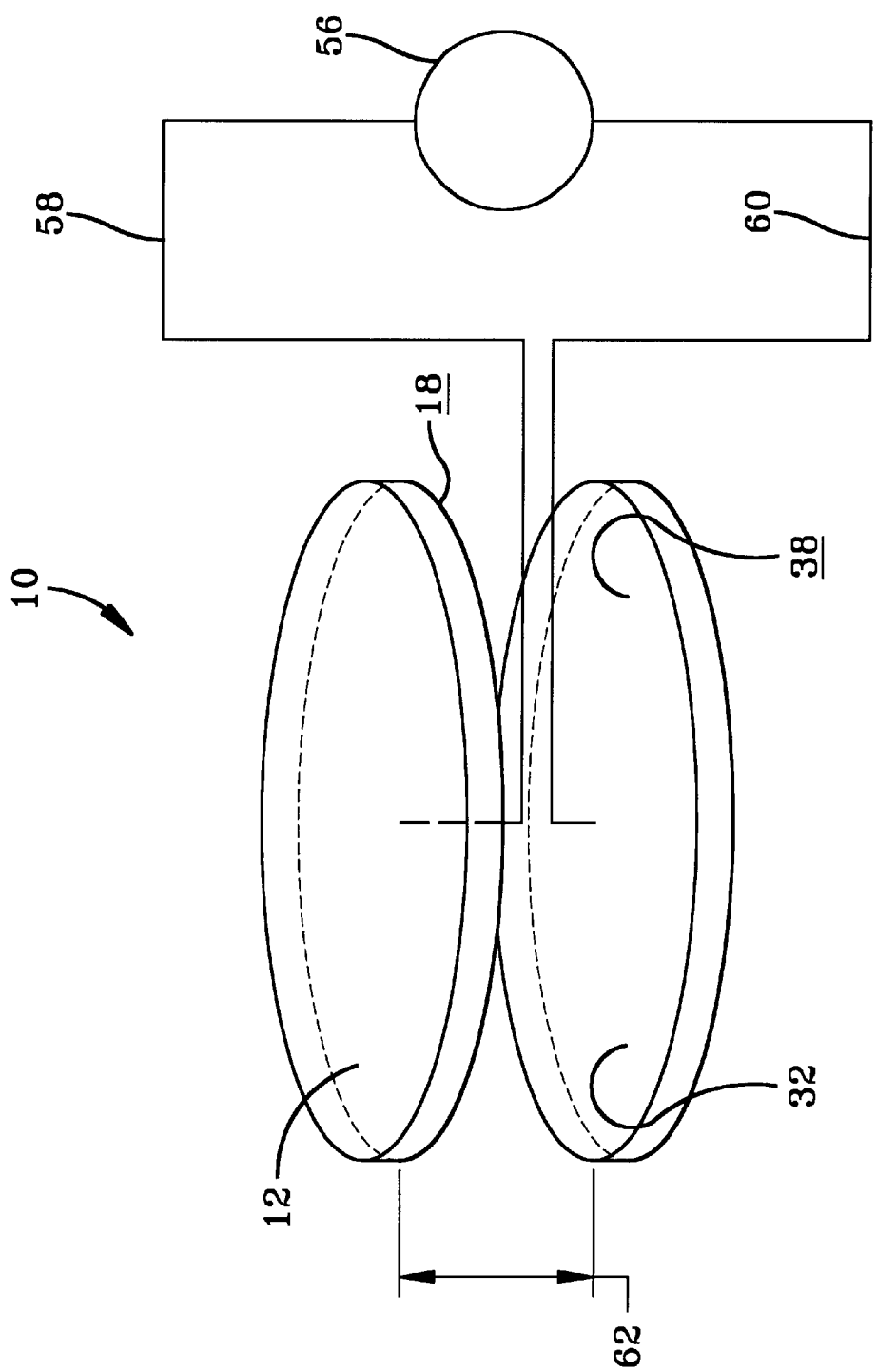
FIG. 3 illustrates one embodiment of an electrostatic actuation control system of the present invention.

FIG. 3 illustrates the wafers 12 and 32 as being connected to a source of voltage 56 applied to wafer 12, by way of connection 58 and electrode 18 and to wafer 32 by way of connection 60 and electrode 38. For such connectors, pads for wire bonding or other conductor attachment are located at a suitable location on each of the wafers 12 and 32, but the wire bondings are placed on the electrodes 18 and 36 so that the bondings do not interfere with the motion of either of the wafers 12 and 32.

In operation, the electrostatic actuation arrangement 10 of FIG. 1 is used to raise and lower the posts 40, 42, 44, 46 and 48 through holes 20, 22, 24, 26, 28 and 30 respectively. The arrangement 10 utilizes the pair of electrodes 18 and 38 in a parallel-plate configuration. The electrostatic force associated with the source of voltage 56 that is applied across the electrodes 18 and 38 of the first and second wafers 12 and 32, respectively, moves wafers 12 and 32 towards each other. The amount of separation 62 between the wafers 12 and 32 is determined by the value of the voltage of source 56, to be further described hereinafter. An alternative electrostatic actuation arrangement 64 may be further described with reference to FIG. 4.

Figure 4:
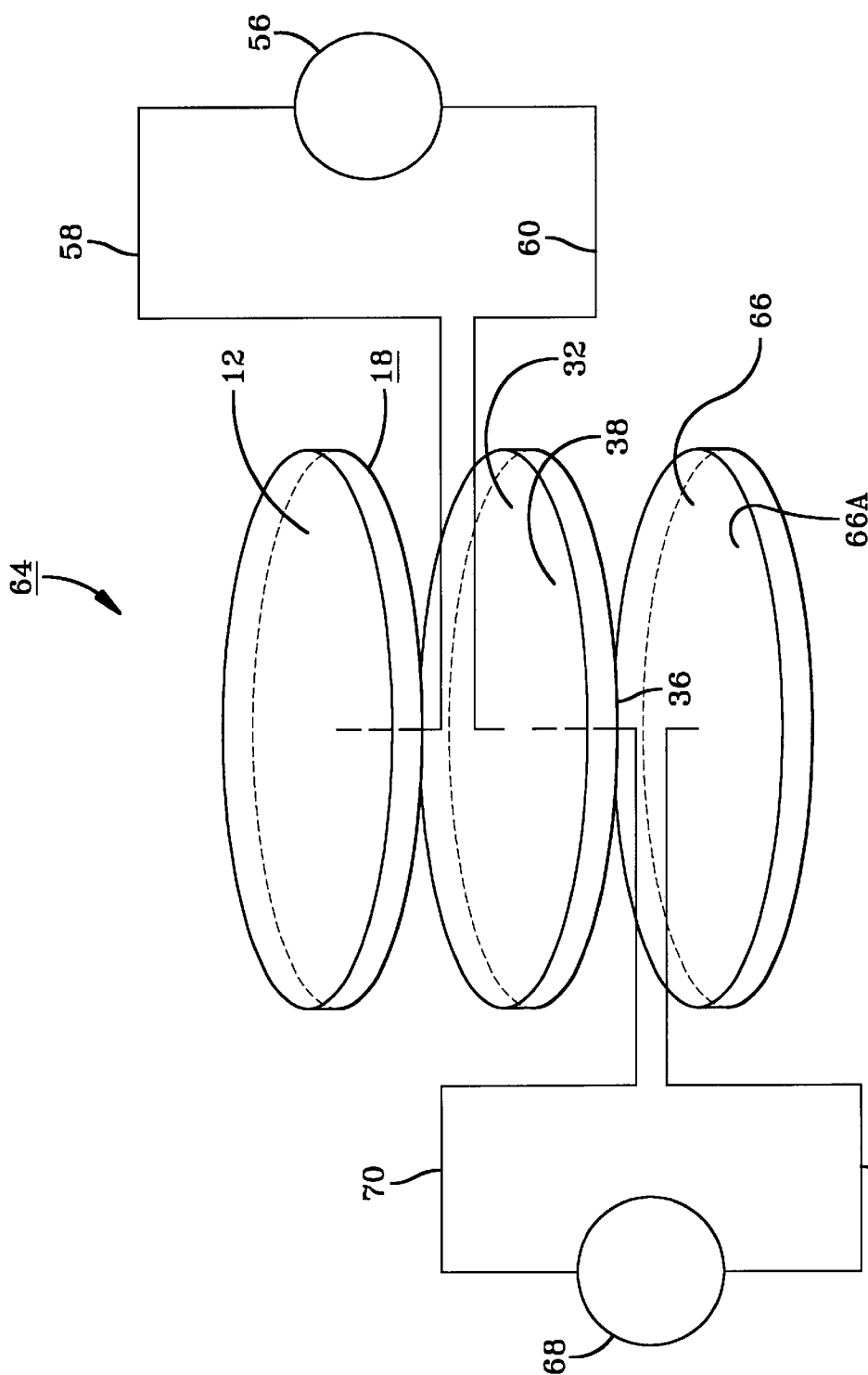
FIG. 4 illustrates another embodiment of an electrostatic actuation control system of the present invention.

FIG. 4 illustrates the electrostatic actuation arrangement 64 as having a third wafer 66 that has an electrode 66A which is the same as electrodes 18 and 38. Similarly, the third wafer 66 has the same dimensions as wafer 32. However, the third wafer 66 does not have posts although it may need a pattern or series of random holes to reduce squeeze-film damping, known in the art. The third wafer 66 has a full electrode, 66A, covering the surface facing the wafer 32 having the posts 40 . . . 50. A second voltage supplied from a source 68 of voltage is applied across the electrode 66A of wafer 66 and an electrode 36 of wafer 32 and operates so that the third wafer 66 pulls the wafer 32 and separates it from the top wafer 12. In most applications, the first wafer 12 may be fixed to a rigid surface and the second wafer 32 with the post may serve as the moving wafer. The third wafer 66 is also preferably fixed to a rigid surface in most applications.

In operation, the wafers 12, 32, and 66 in any arrangement thereof should return to their home position, and in most applications thereof, gravity assists in such a return. However, to ensure that the wafers do not contact each other or remain contact therebetween which would otherwise hinder the wafers 12, 32 and 66 from returning to each respective home position, different embodiments are provided by the practice of the present invention. The different embodiments may be further described with reference to FIGS. 5, 6 and 7 which provide for bumps or stops to prevent any two facing wafers from contacting each other.

FIG. 5 illustrates the wafer 32 having a post, such as post 40, extending upward from its surface. The post 40 has at least one protrusion 74, but preferably two protrusions 74 and 76 extending outward from the surface of the post 40. It is preferred that the protrusions 74 and 76 be placed at a distance of about not more than 200 micrometers from the surface shown in FIG. 5 of the wafer 32. The protrusions 74 and 76 prevent the possibility of the wafer 32 from physically contacting another wafer, such as wafer 12. Without such a suitable stop provided by protrusions 74 and 76, it may be difficult to separate the wafers 12 and 32 once they contact each other. An embodiment for a motion stop that utilizes an elastic material may be further described with reference to FIG. 6.

FIG. 6 illustrates that the post 40 has a piece of elastic material 78 applied thereto. The elastic material may have a thickness of not more than 200 micrometers. A further embodiment that provides for a motion stop, may be further described with reference to FIG. 7.

FIG. 7 shows the wafers 12, 32 or 66 having a piece of elastic material 80 along with one of its surfaces. The elastic material 80 may extend upward from the surface by an amount similar to that of stop 74–76 and 78, that is, by no more than 200 micrometers. The elastic materials 80 act as springs or electrical insulators to prevent the mating between the surfaces of the wafers 12, 32 and 66.

The maximum protrusion of the posts 40, 42, 44, 46, 48, and 50, extending through the holes 20, 22, 24, 26, 28 and 30, respectively, depends upon the thickness of the wafer 12 and the length of the posts 40, 42, 44, 46, 48, and 50. For a post having a length of 400 micrometers, and a thickness of 100 micrometers for the top wafer 12, the maximum protrusion of the posts 40, 42, 44, 46, 48, and 50 respectively into holes 20, 22, 24, 26, 28 and 30 is approximately 300 micrometers. This 300 micrometer displacement requires an initial gap, such as generally indicated by reference number 62 of FIG. 3, between the wafers of about 300 micrometers.

Since electrostatic forces are virtually proportional to the square of the distance of the gap 62, large displacements require correspondingly large voltages. The force for an electrostatic charge applied to a pair of parallel-plate electrodes, such as those of wafers 12 and 32, having an area A, gap x, and voltage V, may be expressed by relationship (1) given below:

$$f = \frac{\varepsilon A V^2}{2x^2} \tag{1}$$

where $\varepsilon$ is the permeativity of the gap ($\varepsilon=8.8\times10^{-12}$ f/m for air). The weight, w, of a wafer, such as wafer 12 or 32, of diameter d, density p, and thickness t may be expressed by relationship (2) given below:

$$w = pgt\frac{\pi d^2}{4} \tag{2}$$

where g is the acceleration of gravity.

Equating the electrostatic force and the weight of the wafer and solving for the voltage yields relationship (3) given below:

$$V^2 = \frac{2pgtx^2}{\varepsilon}. \quad (3)$$

This equation of relationship (3) can be used to estimate the voltage required to bring the two wafers, such as 12 and 32, together for any given initial gap 62. For a 100 $\mu$m thick moving wafer of silicon (p=2330 kg/m$^3$), 60 volts is required for an initial gap 62 of 100 $\mu$m. Other values are easily determined since voltage is linearly proportional to the gap 62.

Figure 8:
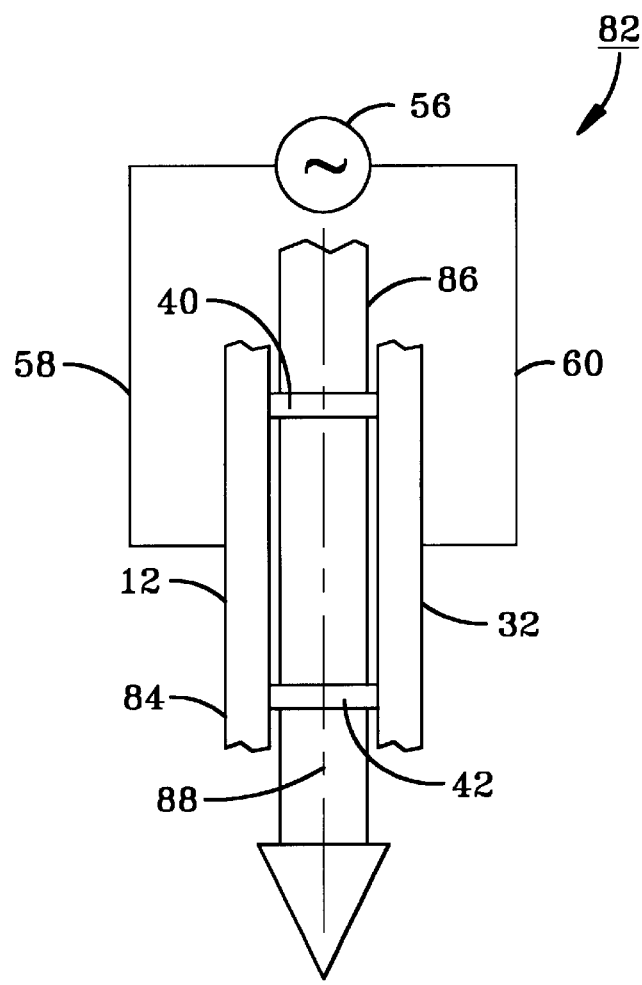
FIG. 8 schematically illustrates a control system that is used to control fluid functions.

The electrostatic actuating arrangements 10 and 64 of FIGS. 3 and 4, respectively, may find applications such as that schematically illustrated in FIG. 8.

FIG. 8 illustrates an arrangement 82 having some of the features previously described with reference to FIG. 3 and is particularly suited to provide a fluid boundary-layer control and fluid heat-transfer augmentations. For either application, the wafer 12 is flush mounted to a wall or surface 84 and the holes (not shown) as well as the posts 40 and 42 preferably has a circle or square cross-sectional shape. In such an application, the posts 40 and 42 are part of the wafer 32 and extend into the fluid, generally indicated by directional arrow 86, when boundary-layer control is required. The posts 40 and 42 preferably extend into flow 86 so as to be perpendicular to the axis 88 of the flow 86.

The amount of voltage supplied by source 56 is in accordance with the relationships (1), (2), and (3). An additional embodiment of the present invention particularly suited for optical switching may be further described with reference to FIG. 9.

Figure 9:
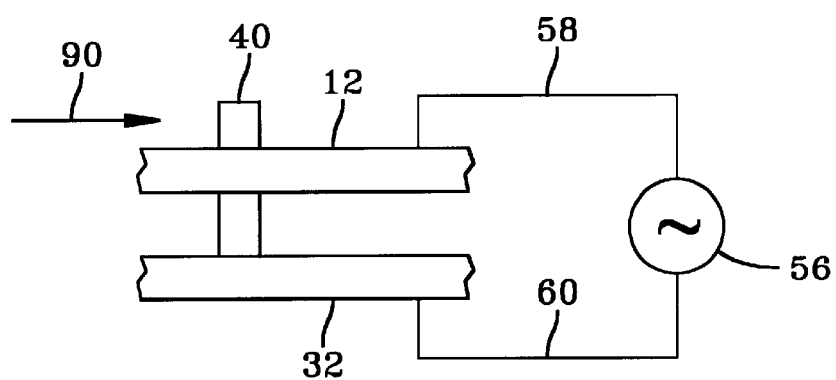
FIG. 9 schematically illustrates a control system used for optical applications.

FIG. 9 illustrates the first and second wafers 12 and 32 arranged in the parallel-plate configuration similar to that of FIG. 8, but with the post 40 of wafer 32 preferably having a triangular or rectangular cross-sectional shape and being retracted or protruding from the complement hole (not shown) in the first wafer 12 so as to intercept or deflect a laser beam 90.

It should now be appreciated that the practice of the present invention provides for electrostatic actuation arrangements that find applications in fluid control and optical control situations.

Although the previous discussion was directed to the wafers 12, 32, and 66 as having a complete shape, such as shown in FIGS. 1 and 2, this is not necessary in that the use of a less than full wafer 2 may be utilized in all of the previously described applications.

Various additional modifications will become apparent to those skilled in the art, and all such variations, which basically rely on the teaching of which this invention advanced the art, are properly considered within the scope of this invention.

What I claim is:

1. An electrostatic actuation arrangement comprising:
   at least first and second wafers with the first wafer having at least one hole and the second wafers having at least one post extending upward from one of its surfaces and dimensioned so as to be insertable into said at least one hole, said first and second wafers having faces that are arranged so that said post faces said hole, said first and second wafers having a layer of conductive material placed on one of their facing surfaces which serves as an electrode, said hole and post being free of said conductive materials; and
   a first source of voltage applied across said electrodes of said faces of said first and second wafers.

2. The electrostatic actuation arrangement according to claim 1 further comprising a third wafer arranged to face the backside of said second wafer and having a layer of conductive material placed on said face of said third wafer.

3. The electrostatic actuation arrangement according to claim 2, wherein said third wafer has at least one hole lined up with and complementary to said post so as to allow insertion therein.

4. The electrostatic actuation arranged according to claim 2 further comprising a second source of voltage applied across said electrodes of said second and third wafers.

5. The electrostatic actuation arrangement according to claim 2, wherein said third wafer had a thickness from about 100 micrometers to about 500 micrometers.

6. The electrostatic actuation arrangement according to claim 2, wherein said first, second and third wafers have a combined thickness of from about 500 micrometers to about 1000 micrometers.

7. The electrostatic actuation arrangement according to claim 2, wherein said third wafer is comprised of silicon.

8. The electrostatic actuation arrangement according to claim 1 further comprising a piece of elastic material having a thickness of less than 200 micrometers and located on one of the layers of conductive material at a position not occupied by a post nor by a hole.

9. The electrostatic actuation arrangement according to claim 1, wherein said first wafer has a thickness from about 100 micrometers to about 200 micrometers.

10. The electrostatic actuation arrangement according to claim 1, wherein said second wafer has a thickness from about 100 micrometers to about 300 micrometers.

11. The electrostatic actuation arrangement according to claim 1, wherein said first and second wafers are comprised of silicon.

12. The electrostatic actuation arrangement according to claim 1, wherein said at least one post extends upward by a distance in the range of about 200 micrometers to about 400 micrometers.

13. The electrostatic actuation arrangement according to claim 12, wherein said at least one post has at least one protrusion extending outward from the surface of said post and located upward from the respective surface of said second wafer at a distance which is less than 200 micrometers.

14. An electrostatic actuation arrangement comprising:
   first and second wafers with the first wafer having at least one hole and the second wafers having at least one post extending upward from one of its surfaces and dimensioned so as to be insertable into said at least one hole, said first and second wafers having faces that are arranged so that said post faces said hole, said first and second wafers having a layer of conductive material placed on one of their facing surfaces which serves as an electrode, said hole and post being free of said conductive material; and
   a first source of voltage applied across said electrodes of said faces of said first and second wafers;
   said first wafer being mounted flush to a surface having a fluid flowing in a direction thereby and said second wafer being separated from said first surface by an amount determined by the selection of a value of said voltage and having its post arranged perpendicular to said direction of said fluid flow.

15. The electrostatic actuation arrangement according to claim 14, wherein said first wafer has a thickness from about 100 micrometers to about 200 micrometers.

16. The electrostatic actuation arrangement according to claim 14, wherein said second wafer has a thickness from about 100 micrometers to about 300 micrometers.

17. The electrostatic actuation arrangement according to claim 14, wherein said first and second wafers are comprised of silicon.

18. The electrostatic actuation arrangement according to claim 14, wherein said at least one post extends upward by a distance in the range of about 200 micrometers to about 400 micrometers.

19. The electrostatic actuation arrangement according to claim 18, wherein said at least one post has at least one protrusion extending outward from the surface of said post and located upward from the respective surface of said second wafer at a distance which is less than 200 micrometers.

20. The electrostatic actuation arrangement according to claim 14 further comprising a piece of elastic material having a thickness of less than 200 micrometer and located on one of the layers of conductive material at a position not occupied by a post nor by a hole.

21. An electrostatic actuation arrangement comprising:
first and second wafers with the first wafer having at least one hole and the second wafer having at least one post extending upward from one of its surfaces and dimensioned so as to be insertable into said at least one hole, said first and second wafers having faces that are arranged so that said post faces said hole, said first and second wafers having a layer of conductive material placed on one of their facing surfaces which serves as an electrode, said hole and post being free of said conductive material; and
a first source of voltage applied across said electrodes of said faces of said first and second wafers;
said first wafer being fixedly mounted and said second wafer being separated from said first wafer by an amount determined by the selection of a value of said voltage and having its post arranged to intercept an optical beam.

22. The electrostatic actuation arrangement according to claim 21, wherein said first wafer has a thickness from about 100 micrometers to about 200 micrometers.

23. The electrostatic actuation arrangement according to claim 21, wherein said second wafer has a thickness from about 100 micrometers to about 300 micrometers.

24. The electrostatic actuation arrangement according to claim 21, wherein said first and second wafers are comprised of silicon.

25. The electrostatic actuation arrangement according to claim 21, wherein said at least one post extends upward by a distance in the range of about 200 micrometers to about 400 micrometers.

26. The electrostatic actuation arrangement according to claim 25, wherein said at least one post has at least one protrusion extending outward from the surface of said post and located upward from the respective surface of said second wafer at a distance which is less than 200 micrometers.

27. The electrostatic actuation arrangement according to claim 21 further comprising a piece of elastic material having a thickness of less than 200 micrometers and located on one of the layers of conductive material at a position not occupied by a post or a hole.

* * * * *